United States Patent
Beall

[11] 3,744,677
[45] July 10, 1973

[54] PORTABLE HOPPER ASSEMBLY FOR BULK MATERIAL WITH SELECTIVELY OPERABLE POWER AND GRAVITY FEED

[76] Inventor: David A. Beall, 1885 Robin Road, San Marino, Calif. 91108

[22] Filed: Feb. 8, 1971

[21] Appl. No.: 113,436

[52] U.S. Cl.................. 222/162, 222/166, 294/73
[51] Int. Cl. ............................................. B66c 3/00
[58] Field of Search.................... 222/162, 164, 165, 222/166; 221/188, 189; 274/73; 214/17 D, 23; 294/73

[56] References Cited
UNITED STATES PATENTS

| | | | |
|---|---|---|---|
| 3,351,237 | 11/1967 | Ortega | 222/166 X |
| 2,692,142 | 10/1964 | Hunter | 222/164 |
| 1,102,297 | 7/1914 | Reid | 221/189 X |
| 2,505,950 | 5/1950 | Dwyer | 222/166 X |

Primary Examiner—Robert B. Reeves
Assistant Examiner—Thomas E. Kocovsky
Attorney—Sellers & Brace

[57] ABSTRACT

A unitary portable hopper assembly for handling bulk material including a hopper tiltably connected to a support frame and equipped with a stationary closure for the hopper outlet. The support frame may be suspended from hoisting means or provided with floor-engaging skids, wheels or the like arranged to support the hopper outlet above a pushcart or other material distributing means. The hopper assembly may include a powered feeder for the forced distribution of the bulk material discharging from the hopper to any of a variety of delivery areas selected at will.

24 Claims, 5 Drawing Figures

PATENTED JUL 10 1973 3,744,677
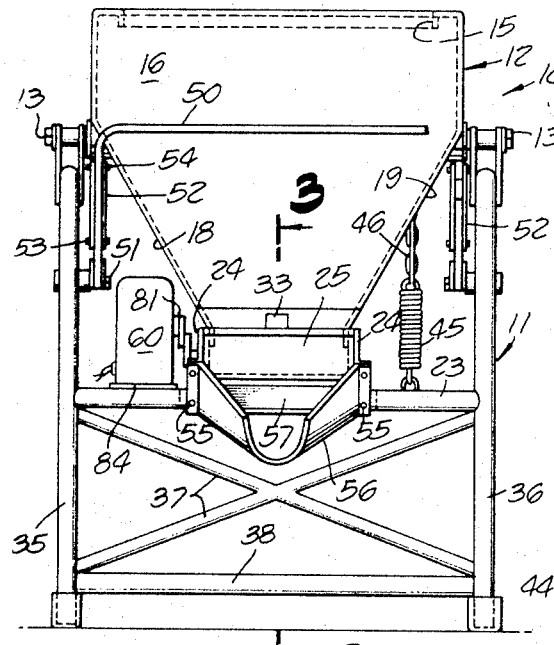
FIG. 1.
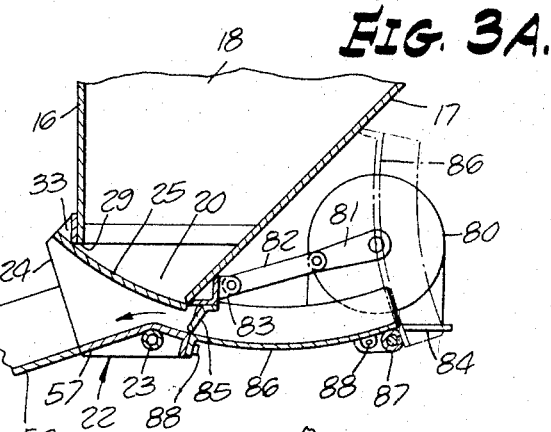
FIG. 3A.
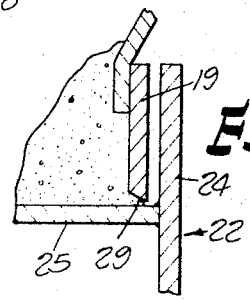
FIG. 4.
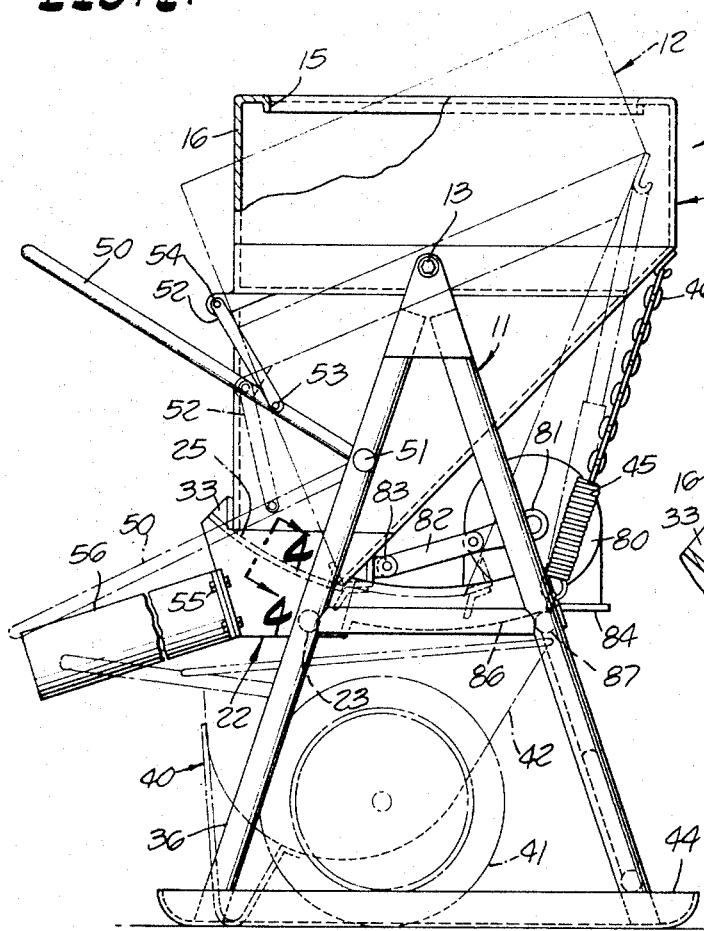
FIG. 2.
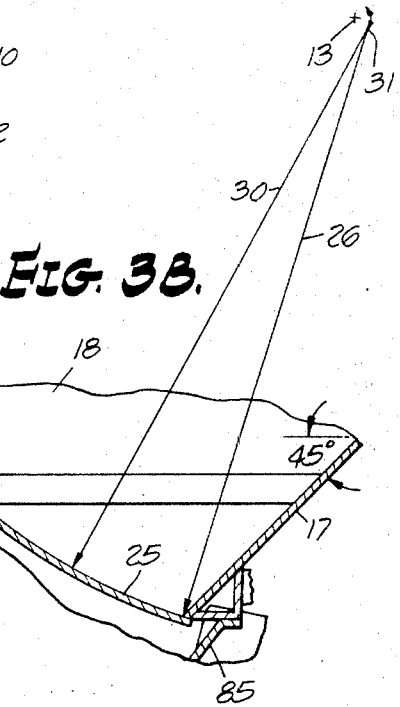
FIG. 3B.
INVENTOR
DAVID ASBURY BEALL
ATTORNEYS

PORTABLE HOPPER ASSEMBLY FOR BULK MATERIAL WITH SELECTIVELY OPERABLE POWER AND GRAVITY FEED

This invention relates to hopper assemblies and more particularly to an improved unitary portable hopper assembly for handling bulk material and for dispensing the contents under accurately and easily controlled conditions utilizing a manually or power operated control and may include a power driven feeder utilizing the closing movement of the hopper to feed the material to a selected delivery area.

This invention is directed more particularly to portable hoppers of the types commonly called transfer assemblies and storage assemblies, and are widely used in handling bulk materials in supply yards and on construction projects. The transfer type hopper assembly is designed for suspension from hoisting equipment whereas storage hopper assemblies are readily movable from place to place along the ground, floor, or other support with the hopper outlet supported at a convenient height for dispensing its contents into a pushcart, wheelbarrow, chute or the like distributing means. Irrespective of whether of the transfer or storage type, these assemblies are customarily sized to handle several yards of loose material such as sand, gravel, rock, concrete mix, coal, grain and the like. It is important that the assembly be ruggedly constructed, that the discharge occur rapidly and utilize a minimum of effort to initiate and cut off flow. It is also important that the hopper and the discharge facilities be designed to avoid the possibility of hangup of material or the possibility of moist or viscous material adhering to the hopper surfaces.

Prior hopper constructions for the foregoing purposes may be divided into two broad categories, namely, those having a stationary hopper and a movable closure, and secondly, those discharging their contents over the top rin edge. Both categories as heretofore designed are subject to numerous disadvantages and shortcomings avoided by the present invention. The invention features a hopper having one upright sidewall and a plurality of associated steeply inclined sidewalls terminating at their lower end in a rectangular outlet opening. The supporting frame for the hopper includes generally triangular sideframes interconnected by crossmembers and having a pivotal connection at the upper apex end with the hopper endwalls. Likewise the closure gate is rigidly secured to the supporting frame. The closure gate or plate has a cylindrical surface inclined acutely to the horizontal and cooperating with the downwardly opening complementally shaped hopper outlet.

In certain applications of the invention storage type hopper assembly it is advantageous to leave the hopper in an area from which it is readily refilled and to distribute the contents of the hopper over a large area in the vicinity of the hopper. The present invention is designed to serve this contingency in a facile manner by utilizing the closing movement of a hopper dispensing cycle to propel a dispensed increment of material along with a number of previously dispensed increments along shiftable chute means to a selected delivery point. Power for this operation is supplied by motor means mounted on the hopper assembly and operating to pivot the hopper, the discharge port of which is equipped with pusher means moving lengthwise of the distributing chute. In consequence, the newly dispensed quantity acts to push previously dispensed quantities along the chute each time the hopper pivots to its closed position. The receiving end of the distributing chute is preferably equipped with a valve which can be opened to permit direct discharge from the hopper outlet into a wheeled cart or other container.

The hopper is equipped with manually operable linkages interconnecting the support frame and the hopper and so arranged that the operator utilizes a minimum of effort in tilting the hopper to any desired open position and in closing the hopper even when substantially fully charged.

Accordingly, it is a primary object of this present invention to provide an improved unitary non-vibratory portable hopper assembly for handling bulk quantities of loose, dry or wet materials.

Another object of the invention is the provision of simplified, more reliable hopper equipment featuring a hopper bodily tiltable relative to a fixed closure and utilizing mechanically operable linkage mechanism for regulating and controlling flow.

Another object of the invention is the provision of a portable hopper assembly including a support frame and a hopper pivoted thereto for movement relative to a stationary closure gate and including a manually operated linkage mechanism for initiating, regulating and cutting off discharge from the hopper.

Another object of the invention is the provision of a manually operated, unitary, portable hopper assembly for bulk material wherein the hopper proper is tiltable toward and away from a closure gate and wherein all interior surfaces of the hopper are inclined at an angle in excess of the angle of repose in all positions of the hopper thereby making it unnecessary to employ agitation to aid discharge of material.

Another object of the invention is the provision of a combination dispensing hopper and feeder assembly for bulk loose material operable to dispense and advance dispensed material in a stream to different selected delivery points.

Another object of the invention is the provision of an improved hopper assembly pivotably supported lengthwise of an enclosed flow passage and including means movable with the hopper to advance dispensed material along the flow passage to a delivery point and including means for bypassing the flow passage when not needed.

These and other more specific objects will appear upon reading the following specification and claims and upon considering in connection therewith the attached drawings to which they relate.

Referring now to the drawings in which a preferred embodiments of the invention is illustrated:

FIG. 1 is a front elevational view of a preferred storage embodiment of the invention combination hopper and feeder assembly showing a material distributing chute in position;

FIG. 2 is a side elevational view of FIG. 1 on an enlarged scale with portions broken away to show constructional details, the full like showing the normal closed position of the hopper and the dot-and-dash lines illustrating the hopper in fully open position and indicating by dot-and-dash lines how a pushcart can be used in lieu of the distributing chute;

FIG. 3A is a fragmentary cross-sectional view taken along line 3—3 on FIG. 1;

FIG. 3B is a fragmentary view similar to FIG. 3A taken along line 3—3 and indicating schematically the eccentric pivotal support for the hopper and;

FIG. 4 is a fragmentary cross-sectional view on a large scale taken along line 4—4 on FIG. 2.

Referring initially more particularly to FIGS. 1 and 2, there is shown an illustrative embodiment of the invention storage hopper and feeder assembly, designated generally 10, including as principal sub-assemblies a supporting frame 11 and an open topped hopper 12. The opposed endwalls of the hopper are pivotally connected through eccentric pivot pin means 13 described in greater detail below to the apexes of the triangular frame 11. Desirably the pivot axis passing through the aligned pin means 13 is closely adjacent the center of gravity of hopper 12, thereby minimizing the effort required to pivot the hopper and its contents.

As herein shown, the upper end portion of the hopper is generally rectangular and its inlet is provided with a reinforced inlet rim 15. The front sidewall 16 is vertically disposed in the closed portion of the hopper, whereas rear wall 17 and end walls 18 and 19 converge downwardly toward a generally rectangular outlet 20.

The stationary duct-like closure unit 22 for hopper outlet 20 is rigidly fixed to the transverse frame member 23 of supporting frame 11. This closure includes bracket plates 24 supporting therebetween a closure plate 25 having a cylindrical surface with a radius 26 (FIG. 3B) centered at 31. The side edges 29 of hopper outlet 20 likewise lie in a cylindrical surface having a radius 30 centered at 31. Radius 30 is preferably slightly less than radius 26. It will be understood that the axes of pivot pins 13 and center 31 are slightly offset from one another, and that center 31 is carried on an eccentric positioned to move center 31 upwardly about the axis of pivot pins 13 as the hopper opens as is made clear in FIG. 3B. When the hopper is closed with its front wall 17 pressed against stop 33 fixed to the forward edge of closure 22, the hopper outlet lips 29 are closely adjacent the surface of closure plate 25 whereas, as the hopper pivots toward open position, lips 29 separate and move away from the surface of plate 25. The interior edges of lips 29 are preferably bevelled, as is best shown in FIG. 4, and cooperate with closure plate 25 in forming a seal against the escape of the material therefrom. For example, concrete mix is effectively sealed even though the edges of lips 29 do not actually engage the surface of plate 25, it being found that the finer constituents of the mix gravitate beneath the edges of the lips whereas larger particles jam against the face of the bevel.

Owing to the eccentric movement of the hopper, it will be apparent that upon opening movement of hopper 12, center 31 moves counterclockwise about center 13 with the result that the distance between lips 29 and closure 25 gradually increases. Likewise during closing movement of the hopper the sharp edges of the lips gradually close toward the surface of the plate 25 without actually bearing against this surface to interfere with the closure movement or to create friction.

As herein illustrated, support frame 11 comprises a pair of triangular shaped end frames 35,36 rigidly interconnected by cross braces 23, 37 and 38. End frames 35,36 are preferably of sufficient height to support the hopper outlet at a convenient working height above the ground to accommodate a conventional pushcart 40 (FIG. 3B) having carriage wheels 41 supporting a dumping bucket 42. Frame 11 may be mounted on skids 44, wheels or the like, to facilitate movement of hopper assembly 10 from place to place about a construction project of other place of use of the invention.

Desirably hopper 12 is biased toward closed position by a tension spring 45 having one end connected to frame 11 and the other end connected to hopper 12 by a chain 46. This spring applies little or no tension to the hopper when closed but resists further opening of the hopper as it approaches its fully open position.

As noted above, the invention hopper assembly can be used selectively (1) to measure and forcibly distribute material from the hopper along a chute to a desired point of delivery or, (2) to discharge bulk material directly from the hopper outlet to an underlying point or into a wheel barrow, pushcart or the like for wheeled transport of the material to a more distant point of use.

When assembled for use with forced feeding, hopper 12 is reciprocated to and fro between open and closed position by a motor 80 having a gear reduction drive to a crank 81 (FIG. 3A) and a link 82 to the lower rear edge of the hopper, as is indicated at 83. Motor 80 is supported on a bracket 84 secured to the cross member 23 of the hopper frame 11. A feeder or pusher blade 85 fixed to and projecting downwardly from the rear edge of the hopper outlet 20 has a reasonably close sliding fit with an arcuate channel-shaped receiving trough 86, the outer end of the latter being hinged at 87 to the hopper frame. Trough 86 is held in its normal operating position, as by cap screws 88 or other suitable means, and its bottom surface has a radius corresponding generally with the pivot axis of the hopper. Its sidewalls are sufficiently high that material will not overflow the upper edges while being forcibly fed forwardly to the left as viewed in FIG. 3A during closing movement of the hopper.

When the forced feeding of the material is not desired, the securing means 88 is removed, permitting trough member 86 to be pivoted rearwardly, such as to the position indicate in dot and dash line in FIG. 3A. When so used, the link 82 for the motor drive is disconnected and opening of the hopper by manual means, as will be described presently, allows the material issuing from the open hopper mouth to gravitate directly downwardly or into a receiving receptacle, such as the pushcart 40 in FIG. 2. It will therefore be appreciated that trough portion 86 also serves as a valve. When this valve is open, material from the hopper discharges into pushcart 40, and when it is closed, motor 80 is operable to forcibly feed increments of material along chute 56.

When the positive feeder is in use the material is pushed by pusher blade 85 into the right hand end of the tubular duct provided by closure unit 22. This unit is rigidly fixed to the hopper frame and to cross member 23 thereof and, in addition to the arcuate bottom plate 25, it includes a lower or bottom plate 88 secured between side plates 24,24. The left hand end of bottom plate 88 slopes downwardly and merges with the inlet to a distributing chute 56 which is held detachably to member 22 by bolts 55 (FIG. 1). Chute 56 may be of any suitable type and extends to any selected point of use of the material discharging from the hopper. Flow along the chute may be induced in part by gravity and in part by the feeding action of feeder plate 85 each time the hopper pivots toward closed position.

A simple but highly effective manually operable means for controlling the position of the hopper and regulating its discharge when not used as a feeder comprises a linkage having a U-shaped operating handle 50. This handle straddles the forward side of hopper 12 and the lower ends of its legs are pivoted by pins 51 to end frames 35,36. Links 52 have their lower ends pivotally connected by pins 53 to the legs of the U-shaped operating lever 50 and their upper ends connected by pins 54 to brackets fixed to the hopper endwalls. When operating lever 50 is in its upper position the hopper is fully closed whereas the downward pivotal movement of lever 50 tilts the hopper 12 counterclockwise about pivot 13 to regulate the size of the discharge through outlet 20. When motor 80 is used to operate the hopper it will be understood that links 52 are disconnected and that the motor drive links 82 are reconnected to the rear edge of the hopper.

In operation, hopper 12 may be charged with material from conveyor means, an overhead spout, or from a transfer hopper. Typically, the hopper may be charged from the outlet of a transit concrete mixer. While being filled, operating lever 50 is in the full line position shown in FIG. 2 and outlet 20 is fully closed.

To discharge a quantity of the contents under manual control, as into pushcart 40, the operator disconnects the motor drive, pivots member 86 to the dotted line position shown in FIG. 3A, places the pushcart in position, and pulls downwardly on lever 50 thereby tilting the hopper counterclockwise. Almost immediately the pivotal movement of handle 50 occurs, the lip of hopper wall 17 (FIG. 3B) pivots to the right away from the rear edge of closure plate 25, allowing a thin stream of the hopper contents to flow into the pushcart. Further downward movement of the operating lever increases the flow rate. It will be understood that the minimum preferred inclination of the hopper walls is 45° to the horizontal, as is indicated in FIG. 3. As the hopper pivots away from closed position this inclination increases and the flow along wall 17 becomes increasingly effective in wiping away any material tending to adhere to this wall between discharge operations.

As soon as a desired quantity of material has been discharged, the hopper outlet is closed by pivoting lever 50 upwardly thereby rotating the hopper and its contents clockwise gradually cutting off the flow and stopping it completely as front wall 16 seats against stop 33.

If the operator wishes to use the power feeder driven by motor 80, link 52 is disconnected from the manually operated lever 50 and motor drive link 82 is reconnected to the hopper at 83. Also, feeder trough 86 is pivoted clockwise to its closed position as shown in full lines in FIG. 3A and firmly secured in place, and distributing chute 56 is secured by bolts 55 to the outlet end of closure plate unit 22. Operation of the motor is now effective to pivot hopper 12 to and fro about pivot 13 allowing measured increments of material to fill channeled member 86 following which the forward cycle of pusher 86 closes the hopper while simultaneously transferring the newly measured increment of material to the left through the tubular passage in member 22 and along chute 56 with other previously measured increments of material.

While the particular portable hopper assembly for bulk material with selectively operable power and gravity feed herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A unitary portable hopper assembly for bulk dispensing quantities of flowable material, said hopper assembly having a main support frame, a hopper having a charging opening and an outlet spaced therefrom, means tiltably mounting said hopper on said frame, curved closure plate means for said hopper outlet immovably fixed to said support frame and having a radius of curvature centered close to but offset slightly from the tilting axis of said hopper and effective to prevent flow of material from said outlet when said hopper is tilted to the normal closed position thereof at one extremity of its tilting range of movement, and linkage means connected between said support frame and said hopper operable to tilt said hopper outlet away from said closure plate means in differing amounts to regulate the rate of flow allowed to take place through said outlet.

2. A hopper assembly as defined in claim 1 characterized in that said support frame includes strut means projecting downwardly below said outlet by a substantial distance and adapted to support said outlet at a convenient working height above a wheeled bulk carrier for the discharge of material from the hopper into the carrier.

3. A hopper assembly as defined in claim 2 characterized in that said support frame includes skid means mounted on said strut means and effective to facilitate skidding of said assembly from place to place along a support surface.

4. A hopper assembly as defined in claim 1 characterized in that said support frame includes triangularly shaped frame means positioned to either lateral side of said hopper and the outlet thereof with its upper apex ends tiltably connected to the opposite lateral sides of said hopper.

5. A hopper assembly as defined in claim 4 characterized in that said tiltable mounting means for said hopper are located closely adjacent a horizontal axis passing through the center of gravity of said hopper, and spring means connected between said hopper and said support frame arranged to be tensioned increasingly as said hopper is pivoted further away from the closed position thereof.

6. A hopper assembly as defined in claim 1 characterized in that said hopper operating linkage means includes manual means for moving the same between the closed and open positions thereof.

7. A hopper assembly as defined in claim 6 characterized in that said manually operated linkage means includes a U-shaped operating lever embracing said hopper crosswise of the forward face thereof with the ends of the legs of said U-shaped lever pivoted to said support frame along a horizontal axis, and linkage means connected between the legs of said U-shaped lever and the adjacent side walls of said hopper and operable as said U-shaped lever is pivoted downwardly to pivot said hopper away from the closed position thereof.

8. A hopper assembly as defined in claim 1 characterized in that said tiltable mounting means interconnecting said hopper and said support frame is so constructed and arranged that the weight of said hopper and its contents are effective to bias said hopper to tilt toward said fixed closure means.

9. A hopper assembly as defined in claim 8 characterized in that said tiltable mounting means includes eccentric means so arranged as to require the hopper and its contents to be elevated while being moved away from the closed portion of said hopper outlet.

10. A hopper assembly as defined in claim 1 characterized in that said closure plate means has a cylindrical closure surface closely adjacent the rim edges of said hopper outlet and which rim edges lie in a cylindrical surface corresponding generally with the cylindrical surface of said closure plate means.

11. A hopper assembly as defined in claim 10 characterized in that said closure plate means is generally rectangular in shape with one transverse edge uppermost and lying below the adjacent transverse side wall of said hopper and with its other transverse edge positioned at a lower level than said one edge, said hopper being tiltable rearwardly crosswise of said other edge, and the volume of flow occuring across said other edge of said closure plate means being dependent upon the degree of rearward tilting movement of said hopper away from the closed position thereof.

12. A hopper assembly as defined in claim 10 characterized in that the axis of the cylindrical surface of said closure plate means is offset slightly from the axis of rotation of said hopper outlet whereby the rim of said hopper outlet tends to open away from the juxtaposed surface areas of said closure plate means.

13. A hopper assembly as defined in claim 10 characterized in that said one edge portion of said closure plate means includes stop means to limit the closing movement of said hopper.

14. A hopper assembly as defined in claim 1 characterized in that said hopper includes one generally upright side wall and a plurality of downwardly converging side walls having their respective lower rim edges cooperating to define the perimeter of said hopper outlet.

15. A hopper assembly as defined in claim 14 characterized in that said support frame includes yoke means overlying the upper end of said hopper for use in suspending said hopper assembly from hoisting cable means.

16. A hopper assembly as defined in claim 14 characterized in that said support frame has generally triangular side frame members disposed to either lateral side of the hopper outlet and includes transverse connector members extending crosswise of the lower portion of said frame members and crosswise of the upright side wall portion of said hopper.

17. A hopper assembly as defined in claim 16 characterized in that said linkage includes a manually operable operating lever having its lower end pivoted to said support frame and equipped with relatively short arm means rigid therewith, and linkage means connecting the lower end of said hopper to the outer end of said short arm means and cooperating with the latter to form a toggle linkage.

18. A hopper assembly as defined in claim 17 characterized in that the connection between the last mentioned linkage means and said short arm means comprises a live pivot which is movable crosswise of dead center as said hopper reaches the closed position thereof and stop means for holding said live pivot in locked position.

19. A hopper assembly as defined in claim 1 characterized in the provision of distributing chute means having an inlet end with its sidewalls positioned to cooperate with the juxtaposed surfaces of said hopper outlet in forming a working seal with said outlet as the hopper pivots between the open and closed positions thereof and to receive material flowing out of said hopper outlet, said hopper having a pusher projecting into said chute means from the lower rear edge of said hopper outlet and effective to push material forwardly therealong as the hopper pivots forwardly toward a closed position, and means for pivoting said hopper back and forth lengthwise of the inlet end of said chute means to discharge a fresh quantity of material thereinto as said hopper pivots to an open position and to transfer material then in said chute means therealong as the hopper pivots to its closed position.

20. A hopper assembly as defined in claim 19 characterized in that said means for pivoting said hopper back and forth includes motor means mounted on said support frame and including means interconnecting said motor means and said hopper and operable by said motor means to reciprocate the outlet end of said hopper to and fro lengthwise of said chute means.

21. A hopper assembly as defined in claim 19 characterized in that said chute means is channel-shaped in cross section along the inlet end thereof with the upper edges of its side walls positioned to provide in cooperation with the adjacent surfaces of the hopper outlet an effective seal against the escape of material as the hopper pivots between the open and closed positions thereof.

22. A hopper assembly as defined in claim 19 characterized in that said material pusher operates to measure substantially equal consecutive increments of material during successive cycles thereof.

23. A hopper assembly as defined in claim 19 characterized in the provision of normally closed valve means in the bottom of said chute means in flow alignment with the hopper outlet when the latter is in any open position whereby material discharging from said hopper may be discharged by gravity without passing along said chute means when said valve means is open and whereby discharging material must pass along said chute means when said valve means is closed.

24. A hopper assembly as defined in claim 23 characterized in that said assembly is selectively operable to discharge material through the outlet thereof directly to the area underlying said outlet or to forcibly advance successive increments of discharging material along said chute means to a delivery area spaced a substantial distance from said hopper assembly.

* * * * *